United States Patent
Gupta

(10) Patent No.: US 9,219,717 B2
(45) Date of Patent: *Dec. 22, 2015

(54) METHODS AND SYSTEMS FOR REGISTERING A PACKET-BASED ADDRESS FOR A MOBILE DEVICE USING A FULLY-QUALIFIED DOMAIN NAME (FQDN) FOR THE DEVICE IN A MOBILE COMMUNICATION NETWORK

(71) Applicant: Cellco Partnership, Basking Ridge, NJ (US)

(72) Inventor: Praveen Gupta, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,889

(22) Filed: Sep. 8, 2014

(65) Prior Publication Data

US 2014/0380041 A1 Dec. 25, 2014

Related U.S. Application Data

(63) Continuation of application No. 13/588,923, filed on Aug. 17, 2012, now Pat. No. 8,832,433.

(51) Int. Cl.
*H04L 29/06* (2006.01)
*H04W 12/06* (2009.01)
(Continued)

(52) U.S. Cl.
CPC ........ *H04L 63/0428* (2013.01); *H04L 61/1511* (2013.01); *H04L 61/1588* (2013.01);
(Continued)

(58) Field of Classification Search
CPC ... H04L 63/029; H04L 63/08; H04L 63/0407; H04L 63/062; H04L 63/2015; H04L 63/0209; H04L 63/0254; H04L 63/0263; H04L 63/0281; H04L 63/12283; H04L 63/12783; H04L 61/2061; H04L 61/35; H04L 61/6059; H04W 80/04

See application file for complete search history.

(56) References Cited

U.S. PATENT DOCUMENTS 7,461,251 B2 * 12/2008 Oishi ............................ 713/162
8,594,103 B2 * 11/2013 Zheng ........................... 370/401

(Continued)

OTHER PUBLICATIONS

3rdGeneration Partnership Project; Technical Specification Group Services and System Aspects; System Improvements for Machine-Type Communications; (Release 11). 3GPP TR 23.888 V1.3.0 (Jun. 2011); pp. 1-130.

(Continued)

*Primary Examiner* — Mohammad W Reza
*Assistant Examiner* — Khoi Le

(57) ABSTRACT

A mobile communication device registers for data communication through a mobile communication network with a packet-based network. The device may or may not have a mobile device number, and registers using a fully-qualified-domain-name (FQDN) uniquely identifying the device in a domain-name-system (DNS) of the packet-based network. A packet-data-network gateway assigns a packet-based address for the device, and generates a request for registering the address with the FQDN in a DNS server. Alternatively, the device generates the packet-based address based on a received portion of the address, retrieves the FQDN from an identity module, and sends a DNS-Update message to the DNS server including the address and FQDN. Again alternatively, a DNS server receives an encrypted DNS update message including a FQDN and a packet-based address, and decrypts the message prior to registering the address and FQDN in a DNS database.

17 Claims, 6 Drawing Sheets

(51) Int. Cl.
*H04L 29/12* (2006.01)
*H04W 12/02* (2009.01)

(52) U.S. Cl.
CPC .......... *H04L61/2076* (2013.01); *H04L 63/062* (2013.01); *H04W 12/06* (2013.01); *H04L 63/102* (2013.01); *H04W 12/02* (2013.01)

(56) References Cited

U.S. PATENT DOCUMENTS 8,832,433 B2  9/2014  Gupta

2008/0271132 A1* 10/2008 Jokela et al. .................... 726/10
2009/0270098 A1* 10/2009 Gallagher et al. ......... 455/435.1
2010/0199332 A1*  8/2010 Bachmann et al. ............... 726/4
2011/0115915 A1*  5/2011 Velusamy .................... 348/158
2012/0224516 A1*  9/2012 Stojanovski et al. ......... 370/310

OTHER PUBLICATIONS

Entire prosecution history of U.S. Appl. No. 13/588,923, filed Aug. 17, 2012, entitled "Methods and Systems for Registering a Packet-Based Address for a Mobile Device Using a Fully-Qualified Domain Name (FQDN) for the Device in a Mobile Communication Network."

* cited by examiner

METHODS AND SYSTEMS FOR REGISTERING A PACKET-BASED ADDRESS FOR A MOBILE DEVICE USING A FULLY-QUALIFIED DOMAIN NAME (FQDN) FOR THE DEVICE IN A MOBILE COMMUNICATION NETWORK

RELATED APPLICATION

This application is a continuation of U.S. patent application Ser. No. 13/588,923, Filed Aug. 17, 2012, now U.S. Pat. No. 8,832,433, the disclosure of which is entirely incorporated herein by reference.

BACKGROUND

In recent years, mobile communication services have expanded and increased in popularity, around the world. Many advanced networks offer wireless mobile communication service for voice calls, mobile messaging services (e.g. text and/or multimedia) and data communications. In parallel with the expansion of services offered by mobile communication networks, new types of devices have been developed that make exclusive use of the data communications services offered by the networks. These devices, which include wireless modems and other machines (e.g., vending machines, parking meters, . . . ), communicate with remote servers using data communication links established through the mobile communication network.

Mobile phones and other devices equipped for communication through mobile communication networks have mobile device numbers (MDNs) or mobile subscriber integrated services digital network numbers (MSISDNs) which are used to uniquely identify the devices on the network. The MDNs or MSISDNs are used to identify and address the devices when setting up voice calls. The MDNs or MSISDNs are similarly used to register devices for data communications, and to allocate internet protocol (IP) addresses for the devices. In devices that are not configured for voice call or messaging services on a network, the MDNs and MSISDNs are thus only used to register the devices for data communications and obtain IP addresses.

As the variety and number of devices on mobile communication networks increase, network operators may run out of MDNs and MSISDNs to allocate to customers' mobile devices. A need therefore exists for enabling devices to register with the network, and to be allocated packet-based addresses (e.g., IP addresses such as IPv6 addresses) for use in data communications on the network, using fully-qualified domain names (FQDNs) to identify themselves on the network. Such registrations may enable mobile devices not having mobile devices numbers (e.g., MDNs and/or MSISDNs) to register with the network. A need further exists for providing the allocated packet-based address for such devices to internet-connected servers, so as to enable the servers to transmit IP communications to the devices.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
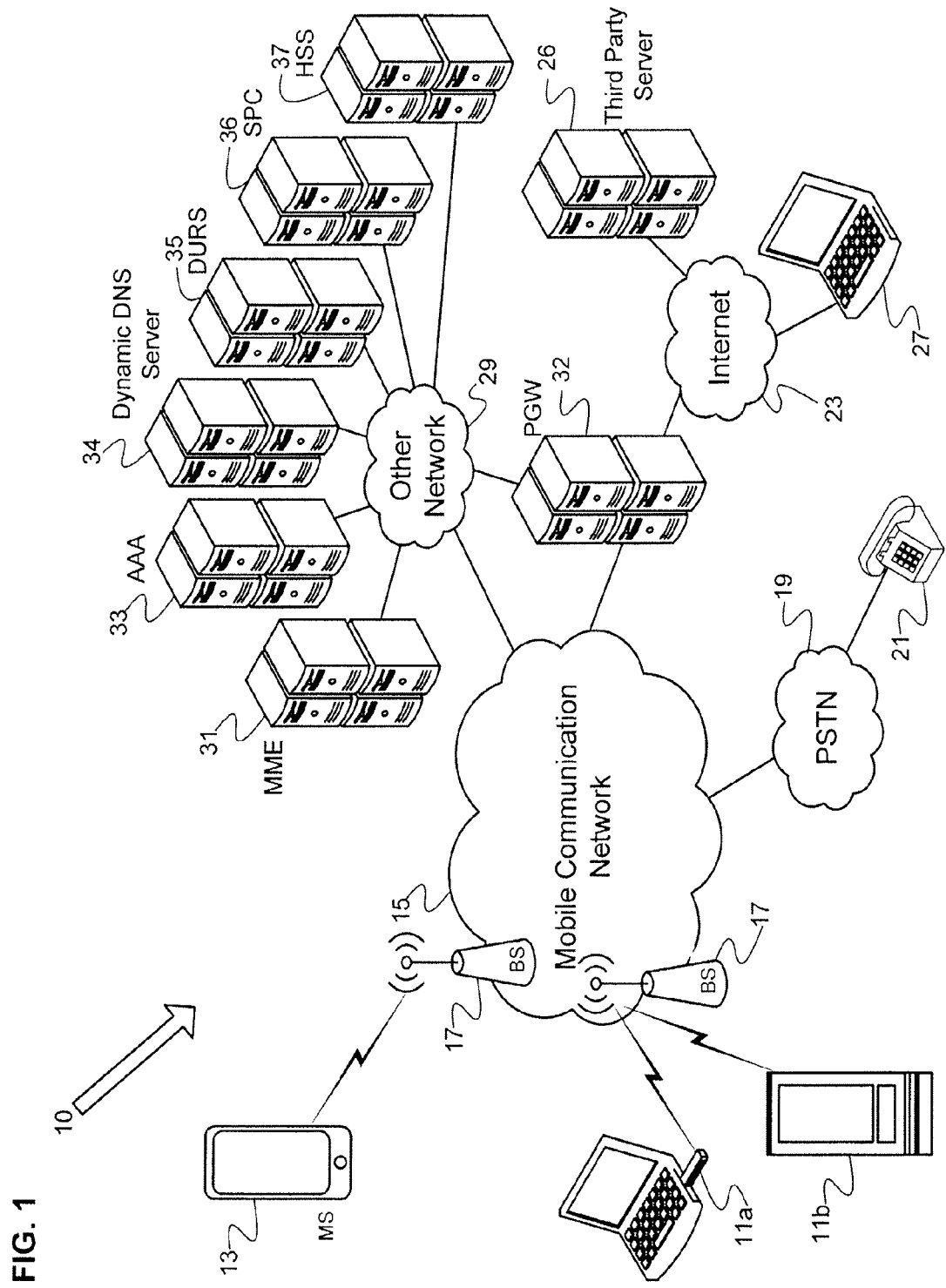
FIG. 1 is a high-level functional block diagram of an example of a system of networks/devices that provide various communications for mobile devices and support a method of registering a packet-based address for a device using a FQDN for the device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to registering, using a fully-qualified domain name (FQDN) for a mobile communication device, a packet-based address for the device for communication in a mobile communication network.

In a first illustrative embodiment, when a mobile device attaches to the mobile communication network, a packet data network gateway (PGW) generates a first number (e.g., a 64-bit number), assigns the first number as the least significant bits (LSBs) of a packet-based address for the device (e.g., an IPv6 address, or other internet protocol (IP) address), and transmits the first/LSB number to the device as part of the attachment procedure. The PGW further assigns a second number (e.g., a 64-bit number) as the most significant bits (MSBs) of the packet-based address for the device, and transmits the second/MSB number to the device as part of a router advertisement message. The PGW further generates and transmits to an authentication, authorization, and accounting (AAA) server a request message including a unique identifier for the mobile device and the packet-based address including the second/MSB and first/LSB numbers. The AAA server generates and transmits to a dynamic domain name service (DNS) server a DNS update message including the packet-based address and a fully qualified domain name (FQDN) associated with the unique identifier for the mobile device. The DNS server stores the FQDN in association with the packet-based address. A third-party server attempting to communicate with the mobile device sends a DNS query to the DNS server including the FQDN. In response to receiving the DNS query, the DNS server sends a DNS response message including the packet-based address associated with the FQDN back to the third-party server. The third-party server attempting to communicate with the mobile device receives the DNS response message, and transmits a packet for the mobile device using the received packet-based address as a destination address.

In a second embodiment, when the mobile device attaches to the mobile communication network, the PGW assigns a first number as the MSBs of the packet-based address for the device, and transmits the first/MSB number to the device in a router advertisement message. The device generates a second number as the LSBs of the packet-based address for the device, and generates the packet-based address including the first/MSB and second/LSB numbers. The device retrieves from a SIM card a FQDN for the device and an authentication key. A DNS client running on the device generates a DNS update message including the packet-based address and the FQDN, encrypts the DNS update message using the authentication key, and transmits the DNS update message to the DNS server. The DNS server decrypts the received DNS update message, and stores the FQDN in association with the packet-based address. A third-party server attempting to communicate with the mobile device sends a DNS query to the DNS server including the FQDN. In response to receiving the DNS query, the DNS server sends a DNS response message including the packet-based address associated with the FQDN back to the third-party server. The third-party server attempting to communicate with the mobile device receives the DNS response message, and transmits a packet for the mobile device using the received packet-based address as a destination address.

In the first and second embodiment, the AAA server and/or a home subscriber server (HSS) can be used to authenticate the identity of the mobile device, and verify that the device is subscribed to or should be provided with the DNS service. Furthermore, in the first and second embodiment, the DNS server receives DNS update messages and, for each received DNS update message, stores the FQDN and the associated packet-based address received in the DNS update message. In the second embodiment, the DNS server is further configured to retrieve a decryption key from a storage associated with the DNS server, and to decrypt the received DNS update message using the retrieved decryption key. Alternatively, in the second embodiment, the DNS server is further configured to forward the received DNS update message to the AAA server for decryption, and to receive the decrypted DNS update message from the AAA. In response to receiving a DNS query including a FQDN, the DNS server retrieves a packet-based address associated with the received FQDN, and generates and sends a DNS response message including the packet-based address.

Reference now is made in detail to the examples illustrated in the accompanying drawings and discussed below.

FIG. 1 illustrates a system 10 for registering in a mobile communication network 15 a packet-based address for a device using a FQDN for the device.

System 10 offers a variety of mobile communication services, including communications for registering a device using a FQDN for the device. The FQDN is used as a public identifier for the device, and can in particular be used to obtain a packet-based address for the device. The example shows one mobile station (MS) 13 and two mobile devices 11a and 11b (referenced generally as device(s) 11) as well as a mobile communication network 15. The mobile devices 11a and 11b are examples of devices that may or may not have mobile device numbers (MDNs) or mobile subscriber integrated services digital network numbers (MSISDNs), and that are configured to register for packet-based communications through network 15 using FQDNs for the devices. In general, the methods and systems described herein do not require use of a MDN or MSISDN for registering the stations or devices, and are therefore compatible with stations and devices that have or that do not have MDNs or MSISDNs. In the following description, while the FQDN is described as being associated with a device or station, the FQDN may instead be associated with a subscriber identity module (SIM) card of a mobile station or device.

The network will provide similar communications for many other devices as well, including mobile stations and devices that do not participate in the registration service. The network 15 provides mobile wireless communications services to those stations and devices, for example, via a number of base stations (BSs) 17 or eNodeBs. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, a 3GPP universal mobile telecommunications system (3GPP-UMTS) standard, a high-speed downlink packet access (HSDPA) standard, or other standards used for public mobile wireless communications. The mobile station 13 may be capable of voice telephone and messaging communication services through the network 15, while mobile devices 11 are not necessarily configured for voice or messaging communication services. The mobile station 13 and devices 11 are capable of data communications through the particular type of network 15 (and the users thereof typically will have subscribed to data service through the network).

The network 15 allows users of the mobile station 13 (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 26 connected to the Internet 23; and the data services for the mobile station 13 and devices 11 via the Internet 23 may be with devices like those shown at 26 and 27 as well as with a variety of other types of devices or systems capable of data communications through various interconnected networks. The mobile station 13 and devices 11 also can receive and execute applications written in various programming languages.

Mobile stations 13 can take the form of portable handsets, smart-phones or personal digital assistants, although they may be implemented in other form factors. Mobile devices 11 can take the form of devices configured for data communication, but generally not for voice communication, through a mobile communication network 15, such as mobile modems, mobile WIFI hotspots, and appropriately equipped parking meters, vending machines, or the like. Program applications, including applications to assist in registering devices for data communication on the network, can be configured to execute on many different types of mobile devices 11. The mobile devices 11, and/or the subscriber identity module (SIM) card contained therein, use a FQDN to identify the devices on the mobile communication network 15, and to register for data communication services on the network. The mobile devices 11 considered herein thus do not require a mobile device number (MDN), mobile subscriber integrated services digital network number (MSISDN), or the like for communication on and/or for registration for packet-based communications on the mobile communication network 15. Such mobile devices 11, referenced generally as MDN-less devices, may therefore not have one or more of a MDN, MSISDN, or other similar number assigned thereto. However, the systems and methods described herein are compatible with mobile devices 11 having a MDN, MSISDN, or the like. In one example, the methods and systems described herein may be used to register a mobile handset station 13 having an associated MDN for packet-based communications, and the registration may make use of a FQDN for the station so as to enable remote packet-based connections to be established with the station (such as remote connections used to establish peer-to-peer connections between multiple handset stations, or between a handset station and a server).

Note that the FQDN-based registration process described herein need not be used by all stations 13 or devices 11 connected to the mobile communication network 15. For example, only some of the stations 13 and devices 11 connected to network 15 may register for FQDN-based services. In the example, only stations 13 and devices 11 that are configured to receive packet-based communications from remote servers or devices may register for FQDN-based services. For instance, a station 13 or device 11 which is configured to function as a server in a client-server communication may register for FQDN-based services; or a station 13 or device 11 which is configured to provide remote-access to its memory, processor, and/or peripherals may register for FQDN-based services.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile station 13 and devices 11, can include one or more RANs and a regional circuit and/or packet switched network and associated signaling network facilities.

Physical elements of a RAN operated by one of the mobile service providers or carriers include a number of base stations and/or eNodeBs represented in the example by the base stations (BSs) 17. Although not separately shown, such a base station 17 can include a base transceiver system (BTS), which can communicate via an antennae system at the site of the base station and over the airlink with one or more of the mobile station 13 and devices 11, when the mobile station or devices are within range. Each base station can include a BTS coupled to several antennae mounted on a radio tower within a coverage area often referred to as a "cell." The BTS is the part of the radio network that sends and receives RF signals to/from the mobile stations 13 and devices 11 that are served by the base station 17.

The radio access networks can also include a traffic network represented generally by the cloud at 15, which carries the user communications and data for the mobile stations 13 and devices 11 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP-type packet data networks 29 (sometimes referred to as an Intranet), i.e., private networks. Generally, such systems are part of or connected for communication via the private network 29. Systems outside of the private network could serve the same functions as well. Examples of such systems, in this case operated by the network service provider as part of the overall network 10, which communicate through the intranet type network 29, include one or more application servers, a mobility management entity (MME) server 31, a packet data network gateway (PGW) 32, an authentication, authorization, and accounting (AAA) server 33, a Dynamic-DNS server 34, a DNS-update request server (DURS) 35, a Kerberos subscriber profile controller (SPC) server 36, a home subscriber server (HSS) 37, or the like.

A mobile station 13 or device 11 communicates over the air with a base station 17 and through the traffic network 15 for various data communications, e.g. through the Internet 23 with a server 26 and/or with servers 31-37. If the mobile service carrier offers the registration service for devices using FQDNs for the devices, the service may be hosted on one or more carrier operated servers 31-37, for communication via the networks 15 and 29. Servers such as 31-37 may provide any of a variety of common application or service functions in support of or in addition to an application program running on the mobile device 11. However, for purposes of further discussion, we will focus on functions thereof in support of the registration service.

Each of the MME 31, PGW 32, AAA 33, and Dynamic-DNS 34 servers can be implemented as separate physical servers as shown, or one or more of the servers could be implemented as a program module running on the same hardware platform as another one of the servers.

In general, the MME server 31 may be configured to perform an initial attach procedure when a mobile station 13 or device 11 connects to the mobile communication network 15, and perform various functions as part of the attach procedure such as authenticating the mobile station 13 or device 11, and selecting a PGW 32 for the station 13 or device 11. The PGW 32 serves as a gateway or bridge between the mobile communication network 15 and external networks such as the internet 23, and as such provides a relay point for communications received from the external networks and destined for stations 13 or devices 11 connected to the mobile communication network 15 and for communications received from stations 13 and devices 11 and destined for the external networks. The PGW 32 can also register stations 13 and devices 11 for communication on the external networks such as the Internet 23.

The AAA server 33 provides authentication, authorization, and accounting services for verifying the identity of and authenticating stations 13 or devices 11 connecting to the mobile communication network 15. The AAA server 33 is in communication with various servers on the mobile communication network 15, such as servers 31, 32, and 34-36, to enable the servers to identify and authenticate stations 13 and devices 11 requesting services from the servers. The Dynamic DNS server 34 provides domain name services for stations 13 and devices 11 connecting to the Internet 23 through the mobile communication network 15, and stores a table associating a packet-based address for each connected station 13 or device 11 with a FQDN uniquely identifying the station or device.

The Kerberos SPC server 36 provides authentication and authorization for stations 13 or devices 11 seeking access to certain services, such as paid value-added services or applications, on the mobile communication network 15. The Kerberos SPC server 36 can be used to verify whether a particular subscriber (e.g., a particular station 13 or device 11) should be provided access to certain services or applications, for example by verifying whether the subscriber has a subscription for a service or application. In some examples, the domain name services provided by the Dynamic DNS server 34 may require authentication and authorization from the Kerberos SPC server 36 prior to providing domain name services for a particular station 13 or device 11.

The HSS 37 maintains a database storing information regarding stations 13 and devices 11 connected to the mobile communication network 15, including information relating to the stations and devices' addresses and connectivity on the network. In one example, the HSS 37 stores a database associating, with an international mobile subscriber identity (IMSI) number or other unique identifier for each station 13 or device 11 connected to the network 15, the FQDN and packet-based address corresponding to the station or device.

To ensure that the application service offered by server 31 is available to only authorized devices/users, the provider of the application service also deploys an authentication AAA server 33 and/or an HSS server 37. Essentially, when a server (e.g., PGW 32 in method 200) receives a service request from a device 11, the server provides appropriate information to the AAA server 33 and/or to the HSS server 37 to allow AAA server 33 and/or HSS server 37 to authenticate the device 11 as outlined herein. Upon successful authentication, the AAA server 33 and/or HSS server 37 informs the requesting server (e.g., 32), which in turn provides access to the service via data communication through the various communication elements (e.g. 29, 15 and 17) of the network 10. In some examples, the PGW 32 communicates with the AAA server 33 which, in turn, communicates with the HSS server 37 to perform the authentication. In other examples, the PGW 32 may communicate directly with the HSS server 37, or alternatively the AAA server 33 may be configured to perform the authentication itself in response to a request from the PGW 32.

Figure 2:
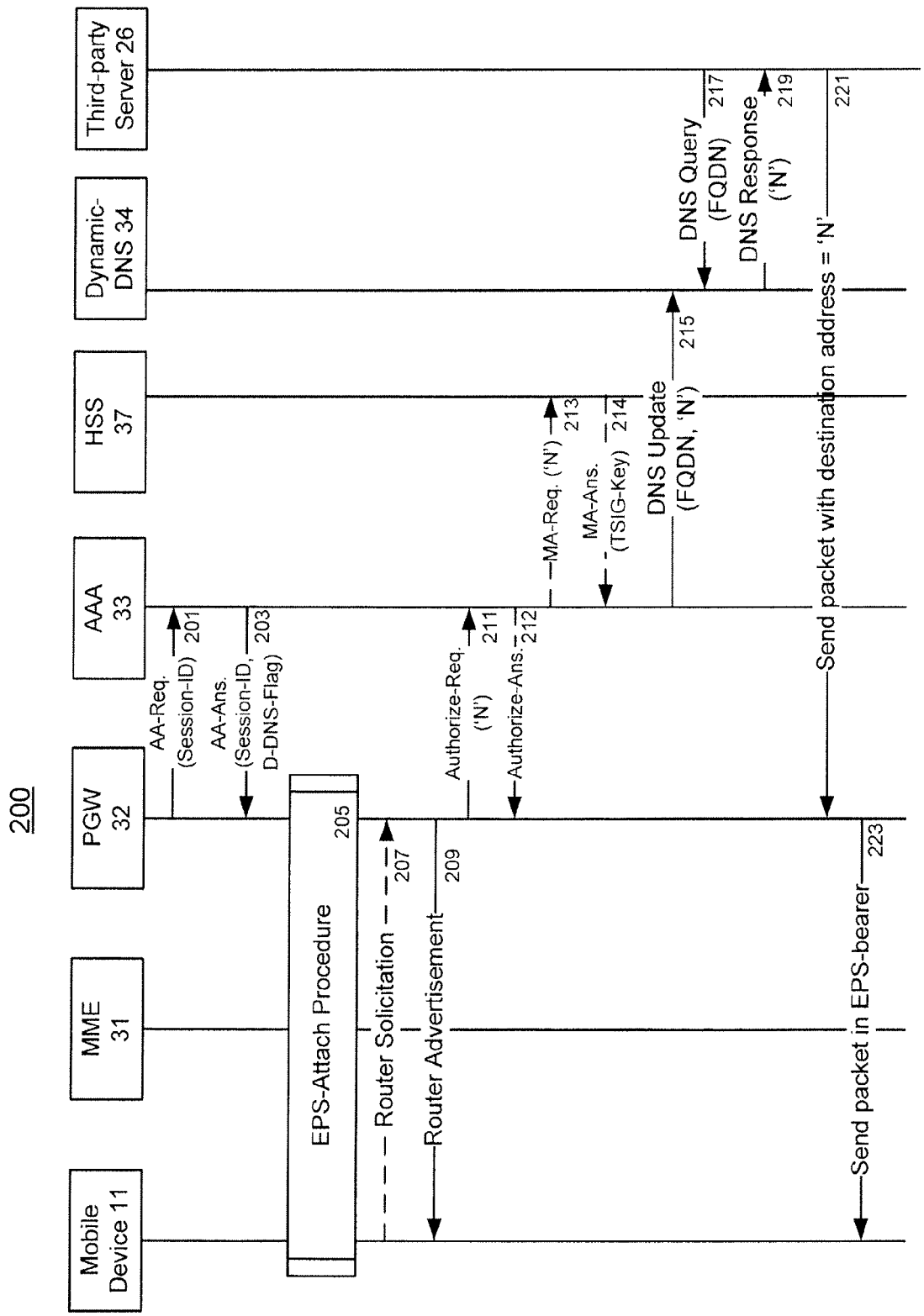
FIGS. 2, 3, and 4 are message timing diagrams of methods for mobile device to register with mobile communication networks, obtain packet-based addresses for data communications on the network, and receive communications from remote devices using the obtained packet-based address.

FIG. 2 is a message timing diagram of a method 200 for a device 11 to register with a mobile communication network using a fully-qualified domain name (FQDN) for the device, obtain a packet-based address for data communications on the network, and receive communications from remote devices using the obtained packet-based address.

The method 200 begins at step 201 with the PGW 32 sending an authorization and authentication request message AA-Request to the AAA server 33 of the mobile communication network 15. The AA-Request message generally includes an identifier (Session-ID) for a communication session established between a particular device 11 and the mobile communication network 15, such as an identifier assigned by the MME server 31 or other appropriate server of the network 15. The AA-Request message can further include an Access Point Name (APN) including an identifier for the network (e.g., the internet) that the particular device 11 is requesting to connect to, and an identifier for a mobile wireless network operator (e.g., an identifier including a mobile country code (MCC) and a mobile network code (MNC) pair) providing mobile communication service for the device 11.

In response to receiving the AA-Request message, the AAA server 33 determines whether to authorize a communication connection for the device on the network based on the identifiers included in the received AA-Request message. If the AAA server 33 determines that the connection should be authorized, the AAA server 33 generates and sends an AA-Answer message to the PGW 32 in step 203. The AA-Answer message includes the communication session identifier (Session-ID), as well as a result code of SUCCESS indicating that the connection should be established. The AA-Answer message further includes a D-DNS-Flag indicative of whether the device 11 requires Dynamic-DNS support. In one example, the D-DNS-Flag is set (i.e., set to a value of a logic 1 or HIGH), so as to cause the PGW 32 to proceed with a DNS Update procedure (corresponding to steps 211-215 of method 200).

The PGW 32 receives the AA-Answer message from the AAA server 33 including the communication session identifier (Session-ID) and the D-DNS-Flag. Following receipt of the AA-Answer message, an evolved packet system attach (EPS-Attach) procedure is performed in step 205. The EPS-Attach procedure can follow a standard attach procedure protocol, such as that defined by TS 23.401. The EPS-Attach procedure may involve communications between the device 11, the MME 31, and the PGW 32, as well as communications through one or more base stations 17 or eNodeBs. The EPS-Attach procedure may be initiated by the device 11 to enable the device 11 to register with the mobile communication network 15.

As part of the EPS-Attach procedure, the PGW 32 assigns two different public packet-based addresses to the device 11. The assignment of the public packet-based addresses to the device 11 results in the device 11 being associated with the addresses such that communications transmitted to the addresses are routed to the device 11. Prior to assigning the addresses, each packet-based address is generated or retrieved from a memory. A first public packet-based address (e.g., a public IP address), referenced herein as the LSB address or as the network-assigned interface identifier (N-IID) for the device 11, is internally generated by the PGW 32 for the device 11 and uniquely identifies the device on the IP-based network 23. A second public packet-based address, referenced herein as the MSB address, is assigned by the PGW 32 based on profile information associated with the device 11 and also uniquely identifies the device on the IP-based network 23. The second public packet-based address can be generated by the PGW 32 based on profile information associated with the device 11, or retrieved by the PGW 32 from the AAA server 33 based on an identifier for the device 11. For example, the PGW 32 may assign a particular second public packet-based address to a device 11 based on the device's subscription information (e.g., such that enterprise subscribers are allocated addresses within a particular range), based on the device's type (e.g., such that vending machines are allocated addresses within another particular range), or the like. The first and second packet-based addresses can be combined, for example by forming a single packet-based address as a text string including the LSB address followed by the MSB address, to form an address referred to herein as "N" for use in communication over a packet-based network such as network 23.

In general, the first packet-based address is provided by the PGW 32 to the device 11 as part of the EPS-attach procedure. The second packet-based address is provided by the PGW 32 to the device 11 as part of a router advertisement message a step 209. The PGW 32 may generate and send to the device a message including the first public packet-based address. In one example, the device 11 is compatible with the open mobile alliance (OMA) device management (DM) protocol.

In the example, upon receiving the message from the PGW 32, if the device 11 is configured with a flag via OMA DM, the flag may automatically configure the device 11 to use the first packet-based address as part of the "N" address. In another example, a flag may be added to an EPS-Attach procedure message received by the device 11 to indicate that the device 11 should preferably use the network-assigned packet-based address as part of the packet-based address for the device.

In one example, the public packet-based address "N" assigned to the device 11 is an IPv6 address formed of 128 bits, and in which the LSB address forms the 64 least significant bits of the IPv6 address and the MSB address forms the 64 most significant bits of the IPv6 address. In the example, the device 11 may be configured to support receipt of device-terminated IPv6 traffic.

Once the EPS-Attach procedure is completed, the device optionally generates and transmits to the PGW 32 a router solicitation message at step 207. In general, the device 11 is assigned and communicated a public packet-based address as part of the EPS-Attach procedure, and the device 11 can use the assigned address for communication following completion of the EPS-Attach procedure. However, if the device 11 moves to a different PGW 32 (e.g., as a result of the device 11 physically moving into a region or onto a network associated with a different PGW of the network 15), the device 11 may generate a router solicitation message so as to receive a new or updated packet-based address. The router solicitation message includes a request from the device 11 for a new router address from the PGW 32, and generally includes a unique identifier for the device 11. In response to receiving the router solicitation message, the PGW 32 retrieves a unique router address assigned to the device 11 or, if no router address is currently assigned to the device 11, the PGW 32 assigns a new unique router address for the device 11.

In general, the router address corresponds to the second/MSB public packet-based address assigned by the PGW 32. In response to completing the EPS-Attach procedure, and/or in response to receiving the router solicitation message, the PGW 32 generates and transmits to the device 11 a router advertisement message in step 209 including the retrieved or newly assigned router address. In general, the PGW 32 is configured to support an address preservation feature that enables a same address to be re-used for a device 11, instead of a new address being assigned to the device 11 in each router advertisement. The address preservation feature may provide a configurable lifetime value for the packet-based address, so as to reduce a frequency with which the Dynamic-DNS server 34 must be updated with the address information. In some examples, the lifetime value may be set to 8 hours, 24 hours, and may ensure that the packet-based address assigned to a device 11 is preserved for that device's use for at least a period of time equal to the lifetime value. The address preservation may thus enable a device 11 to be assigned a same packet-based address each time the device registers with and requests a packet-based address upon connecting to the mobile communication network 15.

In one example, the address preservation feature enables a device 11 to maintain a same packet-based address as long as the device 11 remains connected through the same PGW 32. The device 11 may remain connected to the network through the same PGW 32 if the device 11 remains in a geographical area serviced by the same PGW 32, and/or if the device 11 maintains an active packet-based connection while travelling outside of the area serviced by the PGW 32. In the example, however, the device 11 may be assigned a new packet-based address if the device connects to the network through a different PGW 32, for example in a situation in which the device 11 does not maintain an active packet-based connection and connects to the network in a geographical area services by the different PGW 32.

The router address is a public packet-based address (e.g., an IP address), and in examples in which IPv6 addresses are used, the router address is a 64-bit number that is used as the 64 most significant bits of a 128-bit IPv6 address for the device 11. The router address uniquely identifies the device 11 for data communications over the mobile communication network 15 with the internet 23.

If the D-DNS-Flag received at the PGW 32 in step 203 is set, the PGW 32 generates an Authorize-Request message in step 211 after assigning a public packet-based address for the device 11. For example, the PGW 32 may generate the Authorize-Request message in response to sending a new or updated packet-based address for the device 11 in the router advertisement message (step 209). The Authorize-Request message includes the packet-based address "N" for the device 11, and is transmitted by the PGW 32 to the AAA server 33. The Authorize-Request message can further include an identifier for the mobile device 11, and/or a FQDN for the mobile device 11. The Authorize-Request message is used to inform the AAA server 33 of the packet-based network address that has been assigned to the device 11. The Authorize-Request message is generally transmitted directly from the PGW 32 to the AAA server 33 without passing through the MME server 31. In response to receiving the Authorize-Request message including the packet-based address "N", the AAA server 33 can optionally send an Authorize-Answer message to the PGW 32 in order to confirm receipt of the Authorize-Request message therefrom, in step 212.

Upon receiving the Authorize-Request message, the AAA server 33 can generate and send to the HSS 37 a MA-Request message including the packet-based address "N" for the device 11 in step 213. The MA-Request message may be used to update an entry corresponding to the device 11 in the HSS 37, so as to ensure that the HSS stores the packet-based address "N" for the device 11 in association with other stored data for the device 11. For example, the HSS may store the packet-based address "N" in association with the FQDN for the device, subscription information for the device (or for an associated SIM card of the device) such as user profile information, information on a current connection point of the device to the mobile communication network, or the like. In addition, the MA-Request message can include identifiers for the device 11 and/or the AAA server 33, which may be used to authenticate the device 11 and/or AAA server 33 by comparing the received identifiers with information stored in the HSS 37. In response to the Authorize-Request message, the HSS 37 may thus authenticate the device 11 and/or AAA server 33. If the authentication is successful, the HSS generates a transaction signature (TSIG) key for the transaction, and sends to the AAA server 33 a MA-Answer message including the TSIG key in step 214. The received TSIG key can be used by the AAA server 33 to authenticate itself with the Dynamic-DNS server 34 and encrypt communications therewith.

In addition, the AAA server 33 compares the received packet-based address "N" with a packet-based address, if any, stored by the AAA server 33 and associated with the same device 11. If the comparison results in a match, the AAA server 33 determines that the Dynamic-DNS server 34 does not need to be updated with the address. However, if no packet-based address associated with the device 11 is stored by the AAA server 33, or if a packet-based address associated with the device 11 is stored by the AAA server 33 but the comparison does not result in a match, the AAA server 33 generates a DNS-Update message for transmission to the dynamic-DNS server 34 in step 215. The DNS-Update message includes the packet-based address "N" for the device, as well as a fully qualified domain name (FQDN) uniquely identifying the device. In some examples, the FQDN for device 11 is retrieved by the AAA server 33 based on an identifier for the device 11 included in the Authorize-Request message, such as a private identifier or an IMSI for the device 11. The AAA server 33 transmits the DNS-Update message to the dynamic DNS server 34 such that a DNS record associated with the device 11 can be updated to include packet-based address "N". In general, the DNS-Update message is transmitted to or forwarded to the authoritative DNS server of a home public land mobile network (PLMN) of the device 11.

The FQDN for the mobile device 11 is a unique identifier for identifying the mobile device 11 on the mobile communication network 15. In general, the FQDN is a text string including a hostname corresponding to the device 11, and a series of one or more parent domain names indicative of the device's connectivity in the network 15. For example, the FQDN of a device 11 corresponding to a particular vendor's vending machine may have a structure such as device-1.VendorName.VZWINTERNET.public.3gppnetwork.org, in which device-1 is the hostname for the particular device, and each of VendorName, VZWINTERNET, Public, and 3gppnetwork.org form an ordered series of hostnames indicative of the device's identity in the network.

In response to receiving the DNS-Update message, the Dynamic-DNS server 34 updates a DNS record associated with the received FQDN so as to associate with the FQDN the packet-based address "N" included in the DNS-Update message. In general, the Dynamic-DNS server 34 is formed of a plurality of interconnected DNS servers, each server being associated with a different set of FQDNs. As part of updating the DNS record, the Dynamic-DNS server 34 may therefore retrieve the FQDN from the DNS-Update message, and forward the DNS-Update message to a particular one of the plurality of DNS servers that is associated with (or is most closely associated with or matched with) the FQDN included in the message. The DNS server associated with or most closely associated with the FQDN may be a DNS server that is associated with the parent domain name of the FQDN, and which matches one or more of the local hostname(s) included in the FQDN. In some examples, the parent domain name of the FQDN is a domain name of a carrier, operator, or service-provider of the mobile communication network 15 with which the device has a subscription. In other examples, a carrier/operator/service-provider independent FQDN can be used. For example, a device belonging to vendor can use a FQDN having a parent domain name related to the vendor (e.g., an FQDN such as device-1.vendorName.com). In such an example, the operator independent FQDN can be linked to a second FQDN for the device which is an operator dependent FQDN (e.g., device-1.VendorName.VZWINTERNET.public.3gppnetwork.org), such that the linking enables the packet-based address for the device 11 to be obtained using either the operator-independent or operator-dependent FQDN for the device.

Once the Dynamic-DNS server 34 has updated the DNS record associated with the FQDN, the Dynamic-DNS server 34 can provide the updated packet-based address "N" in response to DNS queries from third-party (or other) servers or devices, such as third-party server 26. For example, in step 217, a third-party server 26 may want to communicate with the device 11. The third-party server 26 may need to send a mobile terminated (MT) message to the device 11 whose unique identifier is FQDN. The third-party server 26 may have access to the FQDN for the device 11, but may not have access to the dynamic packet-based address currently assigned to the device 11. The third-party server 26 generates a DNS-Query message including the FQDN for the device 11, and transmits the DNS-Query to the Dynamic-DNS server 34.

In response to receiving the DNS-Query message, the Dynamic-DNS server 34 retrieves the packet-based address "N" associated with the DNS record corresponding to the FQDN included in the DNS-Query. As part of retrieving the DNS record, the Dynamic-DNS server 34 may therefore retrieve the FQDN from the DNS-Query message, and forward the DNS-Query message to a particular one of the plurality of DNS servers that is associated with (or is most closely associated with or matched with) the FQDN included in the message. The Dynamic-DNS server 34 then generates and transmits to the third-party server 26 a DNS-Response message including the retrieved packet-based address "N".

The third-party server 26, having received the packet-based address "N" associated with the device 11, can then send a packet-based communication to the device 11 using the received address "N" in step 221. The third-party server 26 inserts the received packet-based address "N" as a destination address in each packet of the packet-based communication, and transmits the packets on the network 23. The packets are routed through the network to the PGW 32 associated with the destination "N" address included in each packet, which corresponds to the PGW 32 through which the device 11 is connected to the network 23. Upon receiving each packet, the PGW 32 forwards the packet to the device 11 via an appropriate EPS bearer. If the device 11 is not currently attached to the PGW 32, the PGW 32 sends an internet control message protocol (ICMP) packet (e.g., an ICMP version 6 ICMPv6 packet) back to the third-party server 26 indicating that the destination host is not reachable.

In some examples, the method 200 is compatible with reverse DNS (rDNS) lookup. In such examples, upon receiving a DNS-Update message including a packet-based address as a parameter, the Dynamic-DNS server 34 implements rDNS to convert the received packet-based address into a corresponding FQDN or DNS name. The rDNS lookup can be used for packet-based address validation and spam-filtering. For instance, upon receiving an IP packet, a receiving device 11 can use rDNS to verify the FQDN or DNS name of the device from which the IP packet originated. The receiving device 11 can send a DNS Query to the Dynamic-DNS server 34 including the packet-based address from which the received IP packet was received, and receive in response to the DNS Query a DNS Response including the FQDN or DNS name associated with the packet-based address. In turn, the receiving device 11 can compare the FQDN or DNS name indicated in the DNS Response with a list of approved or authorized FQDNs or DNS names on the device 11, so as to selectively accept only IP packets from approved or authorized sources.

The method 200 thus enables a third-party server 26 to retrieve an up-to-date packet-based address for a device 11 even though the address may be dynamically assigned to the device. The third-party server 26 retrieves the packet-based address from a Dynamic-DNS server 34 using a FQDN for the device 11 which is permanently associated with and uniquely identifies the device 11. The third-party server 26 can then transmit packets through the network 23 to the device 11 using the retrieved "current" packet-based address for the device 11.

While the method 200 shows the steps as occurring sequentially, various steps can be carried out concurrently, repeated, and/or in a different order than shown in FIG. 2. For example, steps 207-215 may be repeated each time the mobile device 11 becomes associated with a different PGW 32, each time the mobile device 11 re-attached to the network, or at other appropriate intervals.

According to the method 200, the PGW 32 generates the first/LSB public packet-based address and communicates the address to the device 11 as part of the EPS-Attach Procedure 205. The method 200 thus generally relies for operation on a PGW 32 that is configured to generate packet-based addresses for operation. According to an alternate method, however, the first/LSB public packet-based address may be generated directly on the device 11. While the alternate method relies on a device 11 having a DNS-Client configured to generate a packet-based address directly on the device 11, the alternate method may use a more basic PGW 32 that is not configured to generate the first/LSB public packet-based address. The alternate method is described below in relation to FIG. 3.

Figure 3:
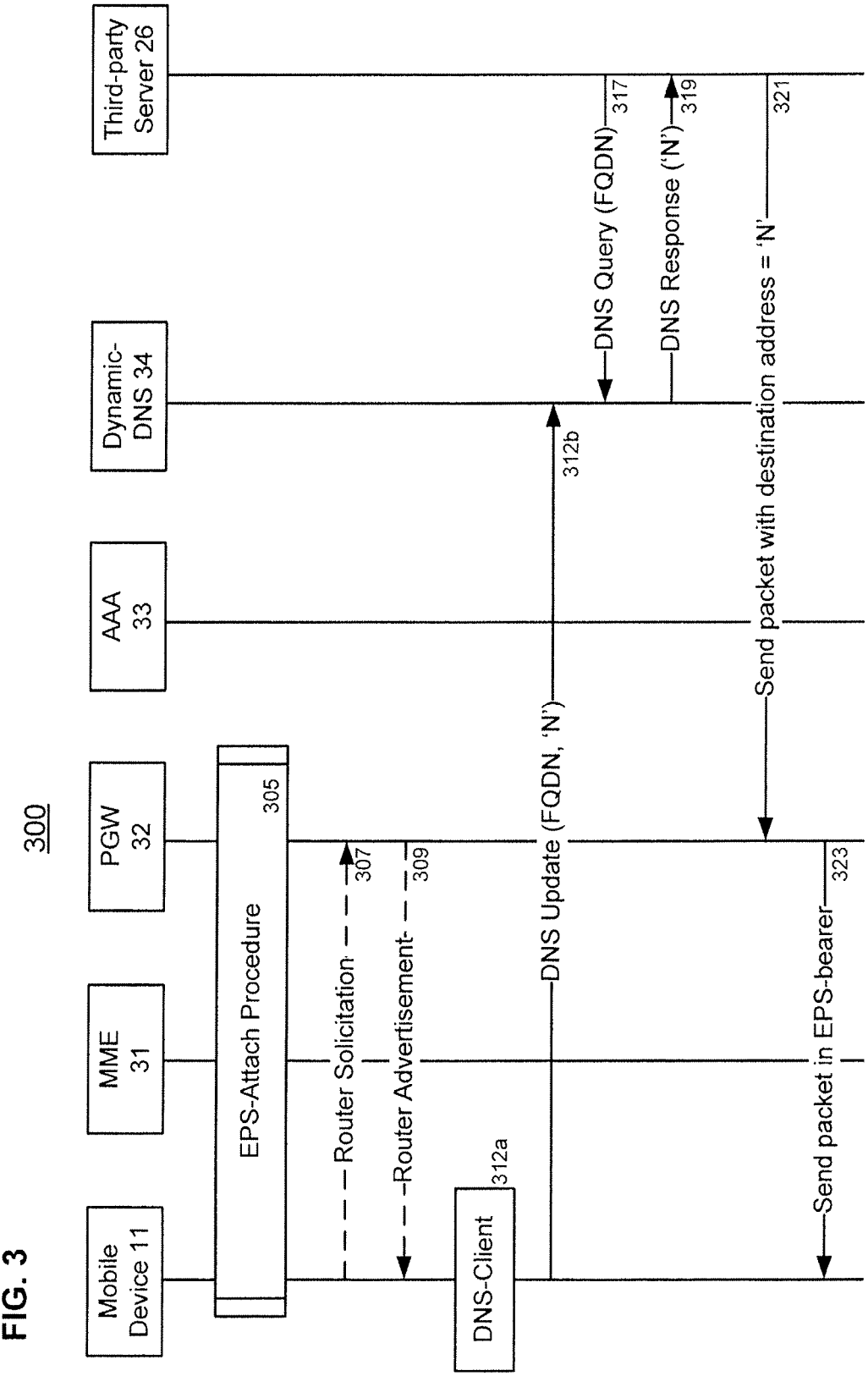

FIG. 3 is a message timing diagram of a method 300 for a device 11 to register with a mobile communication network using a FQDN for the device, obtain a packet-based address for data communications on the network, and receive communications from remote devices using the obtained packet-based address. In the method 300, the device 11 communicates directly with the Dynamic-DNS server 34 to provide the server with the packet-based address for the device 11.

The method 300 includes several steps that are similar to corresponding steps of method 200, and the description of such steps will not be repeated herein. In particular, steps 305, 307, 309, 317, 319, 321, and 323 of method 300 may respectively correspond to steps 205, 207, 209, 217, 219, 221, and 223 of method 200. Reference can be made to the corresponding description of method 200 in relation to these steps.

The method 300 begins with an EPS-Attach procedure in step 305, and the generation and sending of router solicitation and router advertisement messages in step 307 and 309. Following completion of these steps, a DNS-Client running on the device 11 proceeds to perform step 312a. As part of steps 305 and 309, the device 11 has received the MSB address from the PGW 32, and has optionally received the LSB address from the PGW 32 (e.g., in embodiments in which the PGW 32 has generated the LSB address and communicated the address to the device 11). However, the device 11 may not need to use the LSB address (if any) assigned to it by the PGW 32, and may simply discard or ignore any LSB address (if any) assigned to it by the PGW 32. Instead, in step 312a, the device 11 may generate its own LSB address, and form the public packet-based address (referred to herein as the "N" packet-based address) for the device 11 for use in communication over a packet-based network such as network 23 by combining the self-generated LSB address with the MSB address received from the PGW 32. In some examples, the "N" address is a full IPv6 address, and each of the LSB and MSB addresses have lengths of 64 bits.

The DNS-Client of device 11 may further retrieve from a memory of the device 11 a FQDN for the device 11, and optionally an encryption key (e.g., a private encryption key). In one example, the FQDN and the encryption key are stored in and retrieved from a subscriber identity module (SIM) card in the device 11. If the device contains a SIM card, as above, it may not (at least initially) contain identification such as an MDN or MSISDN that permits it to register with the network/ be allocated a packet-based address. The "N" address and perhaps unique identifier can be stored in the SIM card for later use. In the example, the FQDN has been previously stored in the SIM card as part of an activation process for the device 11 and/or for the SIM card which resulted in the FQDN being provisioned to the device. In the example, the encryption key may have been previously stored in the SIM card as part of the activation process or as part of an initial configuration process of the SIM card. In another example, the FQDN is stored directly in the device 11, or in another non-SIM memory of the device 11. For example, the FQDN may be stored as part of device configuration data, or subscriber configuration data, in a memory of the device 11.

The DNS-Client of device 11 generates a DNS-Update message including the FQDN and the public packet-based "N" address, and optionally uses the encryption key to encrypt all or part of the DNS-Update message. The device 11 then transmits the DNS-Update message to the Dynamic-DNS server 34 in step 312b. The Dynamic-DNS server 34 may retrieve the FQDN from the DNS-Update message, and forward the DNS-Update message to a particular one of the plurality of DNS servers that is associated with (or is most closely associated with or matched with) the FQDN included in the message.

In response to receiving the DNS-Update message, the Dynamic-DNS server 34 updates a DNS record associated with the received FQDN so as to associate with the FQDN the packet-based address "N" included in the DNS-Update message. In examples in which the DNS-Update message is encrypted, the Dynamic-DNS server 34 decrypts the DNS-Update message. In one example, the Dynamic-DNS server 34 decrypts the DNS-Update message by forwarding the DNS-Update message to the AAA server 33 for decryption by the authentication server, and receiving the decrypted DNS-Update message back from the AAA server 33. In another example, the Dynamic-DNS server 34 decrypts the DNS-Update message by retrieving, from a database of decryption keys for devices of the mobile communication network, a decryption key for decrypting the DNS-Update message, and decrypting the DNS-Update message using the retrieved decryption key.

Once the Dynamic-DNS server 34 has updated the DNS record associated with the FQDN, the Dynamic-DNS server 34 can provide the updated packet-based address "N" in response to DNS queries from third-party (or other) servers or devices, such as third-party server 26. Steps 317, 319, 321, and 323 illustratively show a process for retrieving the packet-based address "N" for device 11, and for transmitting a packet-based communication to the device 11.

Figure 4:
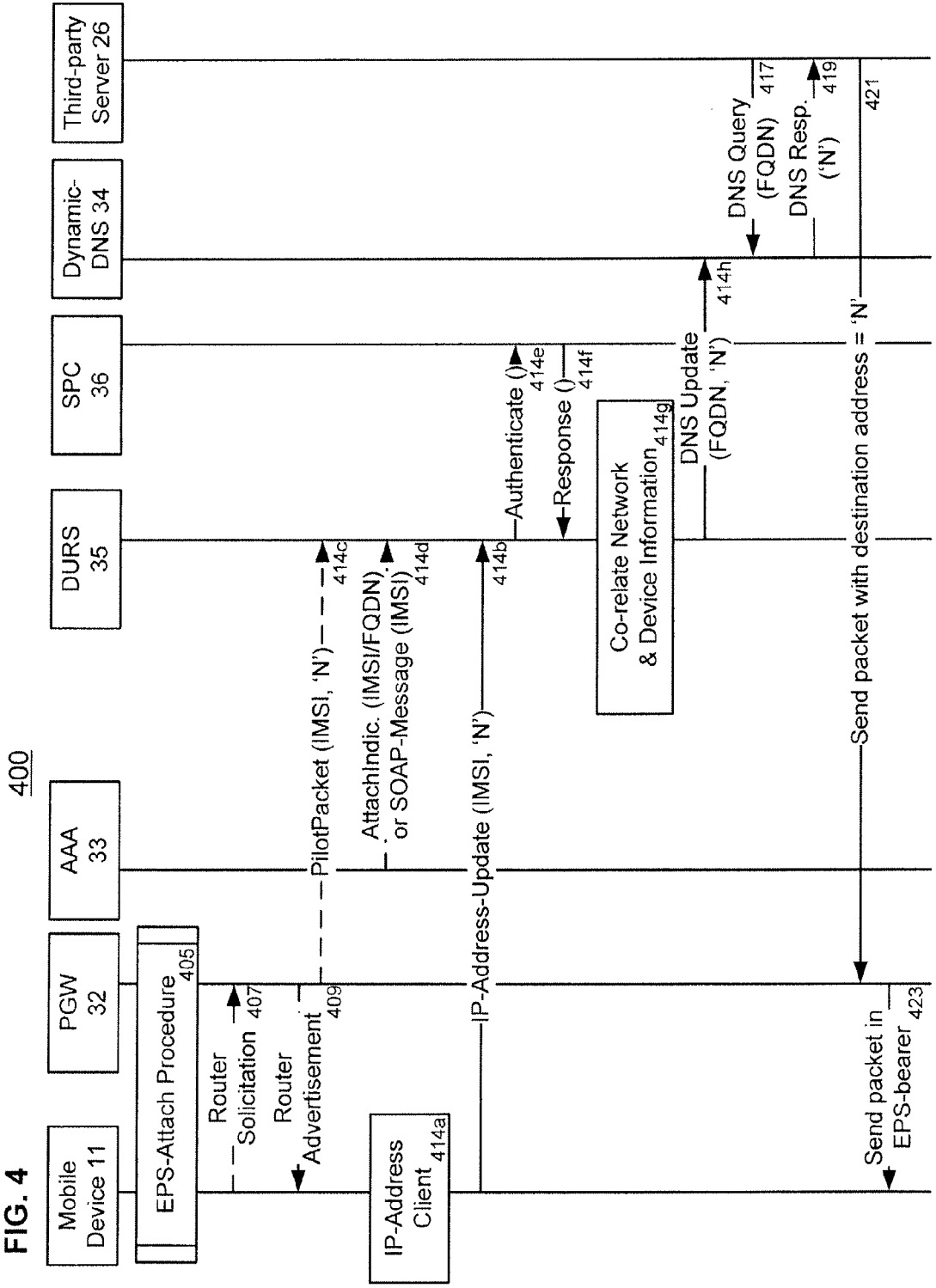

FIG. 4 is a message timing diagram of a method 400 for a device 11 to register with a mobile communication network using a FQDN for the device, obtain a packet-based address for data communications on the network, and receive communications from remote devices using the obtained packet-based address. In the method 400, the device 11 communicates directly with the DNS-Update Request server (DURS) 35, to provide a Dynamic-DNS server with the packet-based address for the device 11.

The method 400 includes several steps that are similar to corresponding steps of method 200, and the description of such steps will not be repeated herein. In particular, steps 405, 407, 409, 417, 419, 421, and 423 of method 400 may respectively correspond to steps 205, 207, 209, 217, 219, 221, and 223 of method 200. Reference can be made to the corresponding description of method 200 in relation to these steps.

The method 400 begins with an EPS-Attach procedure in step 405, and the generation and sending of router solicitation and router advertisement messages in steps 407 and 409. Following completion of these steps, an IP-Address Client running on the device 11 proceeds to perform step 414a. As part of steps 405 and 409, the device 11 has received both the LSB and MSB addresses from the PGW 32. In step 414a, the IP-Address Client of device 11 forms the public packet-based address (referred to herein as the "N" packet-based address) for the device 11 for use in communication over a packet-based network such as network 23 by combining the LSB address with the MSB address. In some examples, the LSB address is generated on the device 11, while in other examples the LSB address is received from the PGW 32 as part of the attach procedure. The "N" address can be a full IPv6 address in certain embodiments. Once the public packet-based address is formed, the device 11 generates and transmits to the DURS 35 an IP-Address Update message including the "N" address and an international mobile subscriber identity (IMSI) number for the device 11.

Following completion of steps 405-409, the PGW 32 optionally generates and transmits to the DURS 35 a Pilot-Packet message including the IMSI of device 11 and the "N" address for the device in step 414c. Alternatively or additionally, in step 414d, the AAA server 33 optionally generates and transmits an Attach-Indication message or a SOAP-Message indicating to the DURS 35 indicating completion of the attach procedure. The Attach-Indication message generally includes one or both of the IMSI and FQDN for device 11, while the SOAP-Message generally includes the IMSI of device 11.

In response to receiving the IP-Address Update message, the DURS 35 can authenticate the IP-Address Update message using a Kerberos SPC server 36. The authentication can be used to ensure that the device 11 is authorized to provide packet-based address update messages, and to ensure that the received update request message is valid. In step 414e, the DURS generates and sends an authentication request message to the SPC server 36 including the IP-Address Update message and/or one or more components thereof. The SPC server 36 validates the IP-Address Update request (or other parameters received in the IP-Address Update message), and generates and sends to the DURS 35 an authentication response message in step 414f.

If the authentication response indicates that the authentication was successful, the DURS 35 proceeds to co-relate the information received in the IP-Address Update message and the Pilot-Packet and/or Attach-Indication messages. In particular, the DURS associates the device information received in the messages, and validates the information in step 414g. The DURS may also determine whether the packet-based address "N" received in the IP-Address Update and/or Attach-Indication messages matches a packet-based address, if any, stored by the DURS 35 and associated with the same device 11. If a match is determined, the DURS 35 determines that the Dynamic-DNS server 34 does not need to be updated with the address. However, if no packet-based address is associated with the device 11 in a storage of the DURS 35, or if no match is determined, the DURS 35 generates a DNS-Update message for transmission to the DNS server 34. The DNS-Update message includes the FQDN and "N" address for the device 11, and is transmitted in step 414h.

The Dynamic-DNS server 34 receives the DNS-Update message, retrieves the FQDN from the DNS-Update message, and forwards the DNS-Update message to a particular one of a plurality of DNS servers that is associated with (or is most closely associated with or matched with) the FQDN included in the message. In response to receiving the DNS-Update message, the Dynamic-DNS server 34 updates a DNS record associated with the received FQDN so as to associate with the FQDN the packet-based address "N" included in the DNS-Update message.

Once the Dynamic-DNS server 34 has updated the DNS record associated with the FQDN, the Dynamic-DNS server 34 can provide the updated packet-based address "N" in response to DNS queries from third-party (or other) servers or devices, such as third-party server 26. Steps 417, 419, 421, and 423 illustratively show a process for retrieving the packet-based address "N" for device 11, and for transmitting a packet-based communication to the device 11.

Unlike the method 300 described previously, the method 400 does not require the use of an encryption key for authenticating the identity of a device 11. As such, the method 400 is not dependent on nor require a SIM authentication key for proper performance.

Figure 5:
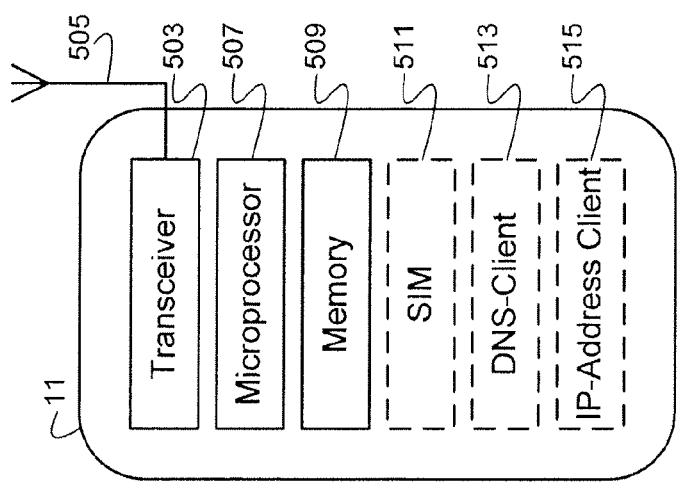
FIG. 5 is a schematic block diagram of a mobile device as may be used in the methods 200, 300, and 400 described in relation to FIGS. 2, 3, and 4.

FIG. 5 is a schematic block diagram of a mobile device 11 as may be used in the methods 200, 300, and 400 described in relation to FIGS. 2-4. The mobile device 11 generally includes a transceiver 503 connected to an antenna 505 and configured for wireless communications with base stations of mobile communication network 15. The device also includes a microprocessor 507, and a memory 509 storing machine readable instructions for execution on the microprocessor for configuring the mobile device 11 to perform functions such as those described in methods 200, 300, and 400. Optionally, the mobile device 11 can also include a subscriber identity module (SIM) 511 which may be a hardware SIM card or software providing the functionality of a SIM card. The mobile device may further optionally include one or both of a DNS Client 513 and an IP-Address Client 515 which may be software providing the functionalities described in relation to methods 300 and 400.

The client device 11 will generally include additional components other than those shown in FIG. 5. For example, the device can include user or machine interfaces for receiving/transmitting commands and communications from/to users and/or machines that the devices are configured to communicate with.

Figure 6:
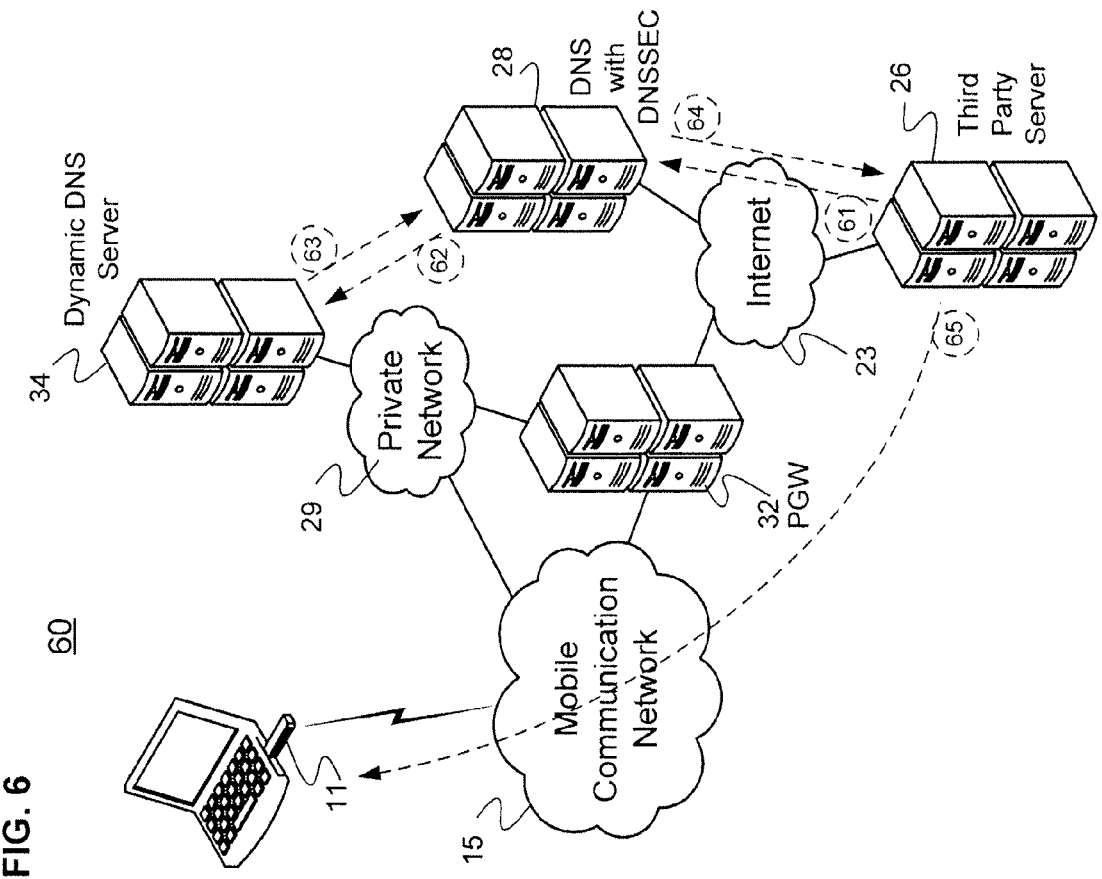
FIG. 6 is a simplified diagram of a system for securely registering in a mobile communication network a packet-based address for a device using a FQDN for the device.

FIG. 6 is a simplified diagram of a system 60 for securely registering in a mobile communication network 15 a packet-based address for a device using a FQDN for the device. The system 60 may be substantially similar to the system 10 of FIG. 1, and like elements in the two systems are referenced with like numerals. While system 60 shows only some of the elements shown in system 10 in order not to overload the figure, the system 60 can generally include all of the elements shown in system 10 of FIG. 1.

System 60 functions substantially similarly to system 10, and each of methods 200, 300, and 400 can be implemented in the system 60. However, in order to improve the security of DNS-related operations with respect to system 10, system 60 includes an additional external DNS server 28 configured to implement Domain Name System Security Extensions (DNSSEC). In general, the external DNS server 28 with DNSSEC is coupled to the public packet-based network (e.g., Internet 23), and as such is accessible from third-party servers 26 coupled to the public packet-based network. In contrast, the internal DNS server 34 is coupled to the private network 29, and is not directly accessible by servers and devices connecting to the Internet 23.

In operation, the external DNS server 28 with DNSSEC is configured to receive DNS-Query messages received from third-party servers 26 or from devices connected to the Internet 23. For example, the external DNS server 28 may receive the DNS-Query messages of steps 217, 317, and 417 (shown as messages 61). In response to receiving the DNS-Query message, the external DNS server 28 retrieves the packet-based address "N" in the DNS-Query, and forwards the DNS-Query message to an internal DNS server 34 that is associated with (or is most closely associated with or matched with) the FQDN included in the message (as shown at 62). The internal DNS server 34 then generates and transmits to the external DNS server 28 a DNS-Response message including the retrieved packet-based address "N" (as shown at 63). In turn, the external DNS server 28 forwards the DNS-Response message to the server 26 or device having previously sent the DNS-Query message (as shown at 64). Finally, the server 26 or device, upon receiving the DNS-Response message, includes the received packet-based address "N" as a destination of packets and transmits the packets to the mobile device 11 associated with the address "N" (as shown at 65).

The user of the external DNS server 28 with DNSSEC provides protection against DNS cache poisoning. In addition, the use of two DNS servers 34 and 28 enables the system 60 to support frequent DNS updates to the Dynamic-DNS server 34, while ensuring the security of DNS records by implementing DNSSEC on the external DNS server 28.

Figures 7, 8:
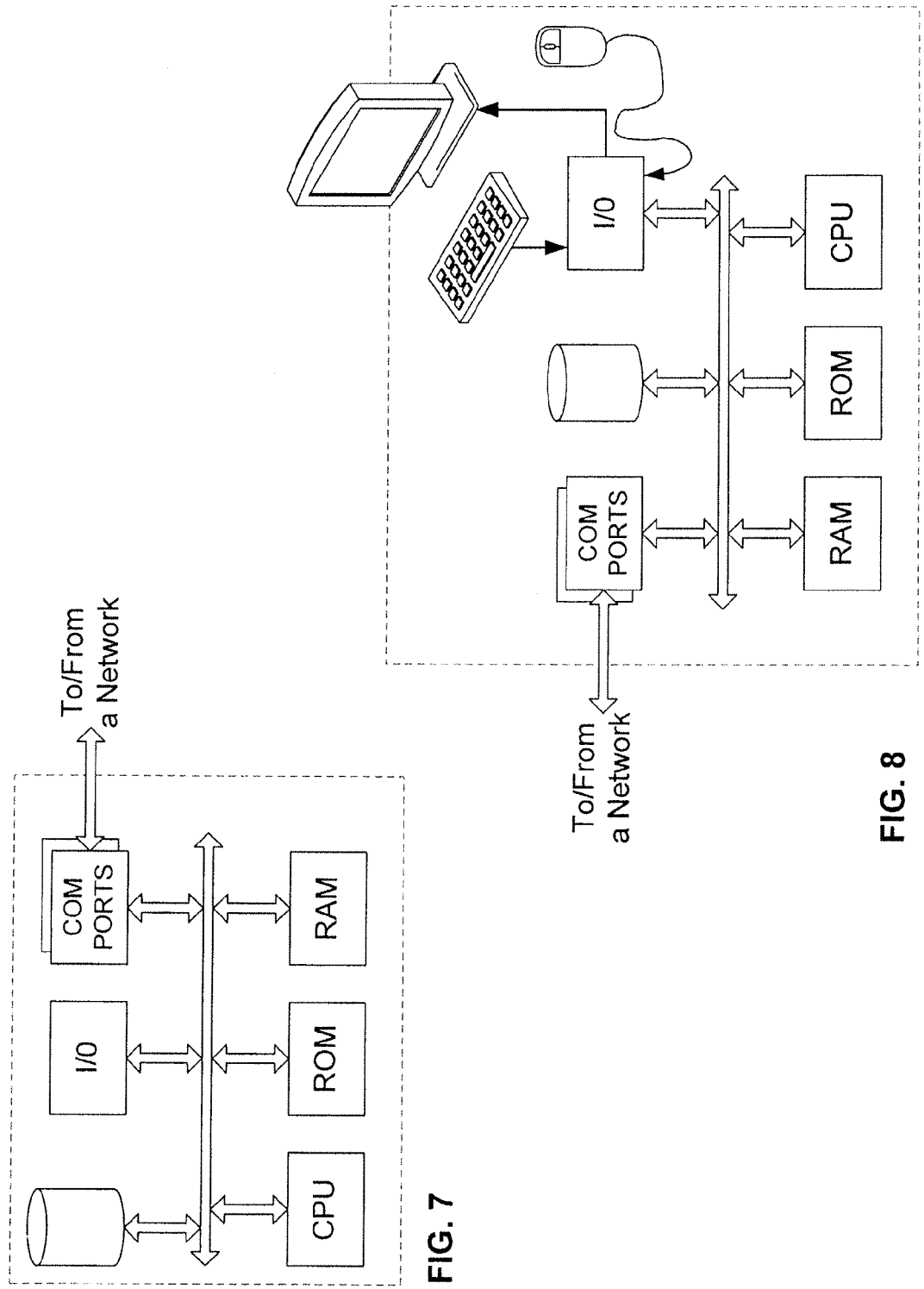
FIG. 7 is a simplified functional block diagram of a computer that may be configured as a host or server, for example, to function as one of servers 31-36 in the system of FIG. 1.
FIG. 8 is a simplified functional block diagram of a personal computer or other work station or mobile device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or mobile device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
   generating, in a gateway connecting a mobile communication network to a packet-based network, respective first portions of packet-network addresses uniquely identifying respective first and second mobile devices connected to the mobile communication network for communication on the packet-based network, responsive to receiving respective requests from the first and second mobile devices;
   in response to the request message, determining, by the gateway, that a router address is currently assigned to the first mobile device and that no router address is currently assigned to the second mobile device;
      upon determining that the router address is currently assigned to the first mobile device, retrieving the router address by the gateway; and
      upon determining that no router address is currently assigned to the second mobile device, assigning the router address to the second mobile device; and
   generating, by the gateway, respective second portions of the packet-network addresses indicating the retrieved router address for the first mobile device and the assigned router address for the second mobile device;
   transmitting each of the first portion and the second portion of the respective packet-network addresses to the respective first and second mobile devices from the gateway;
   transmitting, from the gateway to an authentication server of the mobile communication network, a request message including the first portion and the second portion of the packet-network address of the second mobile device and a fully qualified domain name (FQDN) uniquely identifying the second mobile device in a domain name system (DNS) of the packet-based network; and transmitting, from the authentication server to a DNS server of the packet-based network, a DNS update message responsive to the request message from the second mobile device, the DNS update message including the packet-network address and the FQDN for the second mobile device.

2. The method of claim 1, further comprising steps of:
receiving, in the gateway, a request for a new or updated packet-based address from the first mobile device;
determining, by the gateway, whether to maintain a current router address assigned to the first mobile device or to assign a new router address to the first mobile device based on an address preservation parameter, responsive to the request from the first mobile device;
generating, by the gateway, the second portion of the packet-network address for the first mobile device responsive to the determination; and
transmitting the generated second portion of the packet-network address to the first mobile device from the gateway.

3. The method of claim 2, wherein the address preservation parameter includes a predetermined lifetime value, such that the gateway maintains the current router address assigned to the first mobile device for each request for the new or updated packet-based address received from the first mobile device within a period of time equal to the predetermined lifetime value.

4. The method of claim 2, wherein the address preservation parameter includes an indication to maintain the current router address assigned to the first mobile device when the first mobile device at least one of remains in a geographical area serviced by the same gateway or maintains an active packet-based connection while traveling outside of the geographical area serviced by the same gateway.

5. The method of claim 2, wherein the address preservation parameter includes an indication to assign the new router address to the first mobile device when the first mobile device connects to the mobile communication network through a different gateway.

6. The method of claim 1, further comprising a step of:
forwarding, by the DNS server of the packet-based network, the DNS update message to a further DNS server of the packet-based network associated with the FQDN uniquely identifying the second mobile device in the DNS update message.

7. A method comprising steps of:
receiving, in a mobile device connected to a mobile communication network, a first portion of a first packet-network address uniquely identifying the mobile device for communication on a packet-based network accessed through the mobile communication network, the first portion of the first packet-network address received by the mobile device from a first gateway connecting the mobile communication network to the packet-based network;
generating, in the mobile device, the first packet-network address uniquely identifying the mobile device for communication on the packet-based network, by combining the received first portion of the first packet-network address with a second portion of the first packet-network address; wherein the second portion of the packet-network address is received from the first gateway in response to the transmitted request message, and the second portion indicates a router address retrieved by the first gateway; and wherein the first gateway retrieves the router address upon determination that the router address for the first gateway is currently assigned to the mobile device;
retrieving, from an identity module of the mobile device, a fully qualified domain name (FQDN) uniquely identifying the mobile device in a domain name system (DNS) of the packet-based network; and
receiving, in the mobile device, a first portion of a second packet-network address uniquely identifying the mobile device for communication on the packet-based network accessed through the mobile communication network, the first portion of the second packet-network address received by the mobile device from a second gateway connecting the mobile communication network to the packet-based network;
generating, in the mobile device, the second packet-network address uniquely identifying the mobile device for communication on the packet-based network, by combining the received first portion of the second packet-network address with a second portion of the second packet-network address; wherein the second portion of the second packet-network address is received from the second gateway in response to the transmitted request message, wherein the second gateway allocates the router address to form the second portion of the second packet network address upon determination that no router address for the second gateway is currently assigned to the mobile device;
generating and sending, from the mobile device to a DNS server of the packet-based network, a DNS update message including the generated second packet-network address and the retrieved FQDN to cause the DNS server to update an entry in a DNS database associating the FQDN with the generated second packet-network address.

8. The method of claim 7, further comprising steps of:
in response to a request to attach the mobile device to the mobile communication network, receiving in the mobile device, from the second gateway connecting the mobile communication network to the packet-based network, the allocated second portion of the second packet-network address allocated by the gateway uniquely identifying the mobile device for communication on the packet-based network;
ignoring, by the mobile device, the allocated second portion of the second packet-network address received from the gateway; and
generating, in the mobile device, the a different second portion of the second packet-network address uniquely identifying the mobile device on the packet-based network,
wherein the second packet-network address is generated based on the received first portion of the second packet-network address and the generated second portion of the second packet-network address.

9. The method of claim 7, further comprising steps of:
retrieving an encryption key from the identity module of the mobile device; and
encrypting, in the mobile device, the generated DNS update message using the encryption key,
wherein the sending the DNS update message comprises sending the encrypted DNS update message to the DNS server.

10. The method of claim 7, further comprising a step of:
forwarding, by the DNS server of the packet-based network, the DNS update message to a further DNS server of the packet-based network associated with the FQDN uniquely identifying the mobile device in the DNS update message, to cause the further DNS server to update the entry in the DNS database.

11. A method comprising steps of:

receiving, in a mobile device connected to a mobile communication network, a first portion of a first packet-network address uniquely identifying the mobile device for communication on a packet-based network accessed through the mobile communication network;

generating, in the mobile device, the packet-network address uniquely identifying the mobile device for communication on the packet-based network, by combining the received first portion of the first packet-network address with a second portion of the first packet-network address to form the packet-network address;

generating and sending, from the mobile device to a domain name system update request server (DURS) of the packet-based network, an internet protocol (IP)-address update message including the generated packet-network address and an international mobile subscriber number (IMSI) of the mobile device;

retrieving, from the DURS, a fully qualified domain name (FQDN) uniquely identifying the mobile device in a domain name system (DNS) of the packet-based network based on the generated packet-network address, responsive to the IP-address update message; and receiving, in the mobile device, a first portion of a second packet-network address uniquely identifying the mobile device for communication on the packet-based network accessed through the mobile communication network;

generating, in the mobile device, the second packet-network address uniquely identifying the mobile device for communication on the packet-based network, by combining the received first portion of the second packet-network address with a second portion of the second packet-network address; wherein the second portion of the second packet-network address includes a router address that is allocated upon determination that no router address is currently assigned to the mobile device; and sending, from the DURS to a DNS server of the packet-based network, a DNS update message including the generated first packet-network address and the retrieved FQDN to cause the DNS server to update an entry in a DNS database associating the FQDN with the generated first packet-network address.

12. The method of claim 11, further comprising a step of:

authenticating, between the DURS and a subscriber profile controller (SPC) server of the packet-based network, the IP-address update message received from the mobile device, to determine at least one of whether the mobile device is authorized to provide packet-based address update messages or whether the received IP-address update message is valid, wherein the FQDN is retrieved and the DNS update message is sent from the DURS to the DNS server when the IP-address update message is authenticated.

13. The method of claim 11, further comprising, prior to sending the IP-address update message, at least one of:

sending, from a gateway connecting the mobile communication network to the packet-based network, a pilot-packet message to the DURS, the pilot-packet message including the IMSI of the mobile device and the packet-network address uniquely identifying the mobile device; or sending, from an authentication server of the mobile communication network, an indication message to the DURS, the indication message including at least one of the IMSI of the mobile device or the FQDN of the mobile device.

14. The method of claim 13, further comprising step of:

validating, by the DURS, information received in at least one of the pilot-packet message or the indication message based on at least one of network information or device information stored on the DURS, wherein the DNS update message is sent from the DURS to the DNS server when received information in at least one of the pilot-packet message or the indication message is validated.

15. The method of claim 11, further comprising a step of:

determining, by the DURS, whether at least one of the IMSI or the generated packet-network address in the received IP-address update message matches corresponding information stored on the DURS, to validate the IP-address update message, wherein the DNS update message is sent from the DURS to the DNS server when the IP-address update message is validated.

16. The method of claim 11, further comprising a step of:

generating, in the mobile device, the second portion of the packet-network address uniquely identifying the mobile device on the packet-based network, wherein the packet-network address is generated based on the received first portion of the packet-network address and the generated second portion of the packet-network address.

17. The method of claim 11, further comprising a step of:

in response to a request to attach the mobile device to the mobile communication network, receiving in the mobile device, from a gateway connecting the mobile communication network to the packet-based network, the second portion of the packet-network address allocated by the gateway uniquely identifying the mobile device for communication on the packet-based network, wherein the packet-network address is generated based on the received first portion of the packet-network address and the received second portion of the packet-network address.

* * * * *